United States Patent
Regnier et al.

(12)

(10) Patent No.: US 6,249,448 B1
(45) Date of Patent: Jun. 19, 2001

(54) ELECTRONIC POWER DEVICE AND ELECTRONIC POWER ASSEMBLY COMPRISING SUCH A DEVICE

(75) Inventors: Bernard Regnier, Villefontaine; Jacques Cettour-Rose, Borderes sur l'Echez; Patrick Luscher, Heyrieux; Daniel Fellmann, Ibos, all of (FR)

(73) Assignee: Alstom Transport SA, Paris (FR)

( * ) Notice: Subject to any disclaimer, the term of this patent is extended or adjusted under 35 U.S.C. 154(b) by 0 days.

(21) Appl. No.: 09/283,149

(22) Filed: Apr. 1, 1999

(30) Foreign Application Priority Data

Apr. 6, 1998 (FR) .................................... 98 04228

(51) Int. Cl.$^7$ ........................................ H02M 1/00
(52) U.S. Cl. ...................... 363/144; 363/141; 361/821
(58) Field of Search ..................... 363/144, 141, 363/34, 40; 361/821, 825, 830, 831

(56) References Cited

U.S. PATENT DOCUMENTS 5,132,896 * 7/1992 Nishizawa et al. ................ 363/144
5,142,439   8/1992 Huggett et al. .................... 361/321
5,172,310 * 12/1992 Deam et al. ...................... 363/144

FOREIGN PATENT DOCUMENTS 2242580  10/1991  (GB) .
09117126  5/1997   (JP) .

* cited by examiner

*Primary Examiner*—Jessica Han
(74) *Attorney, Agent, or Firm*—Dowell & Dowell, P.C.

(57) ABSTRACT

An electronic power device including at least one sub-system supporting power modules, a capacitor battery connectable to an electrical power supply and being connected to the power modules. The capacitor battery includes one or more capacitors which when a plurality are provided are disposed in parallel between first and second connection plates. Each sub-system has a first face supporting at least one first power module and a second face for supporting at least one second power module and wherein the first plate is connected to each first power module and the second plate is connected to each second power module.

20 Claims, 7 Drawing Sheets

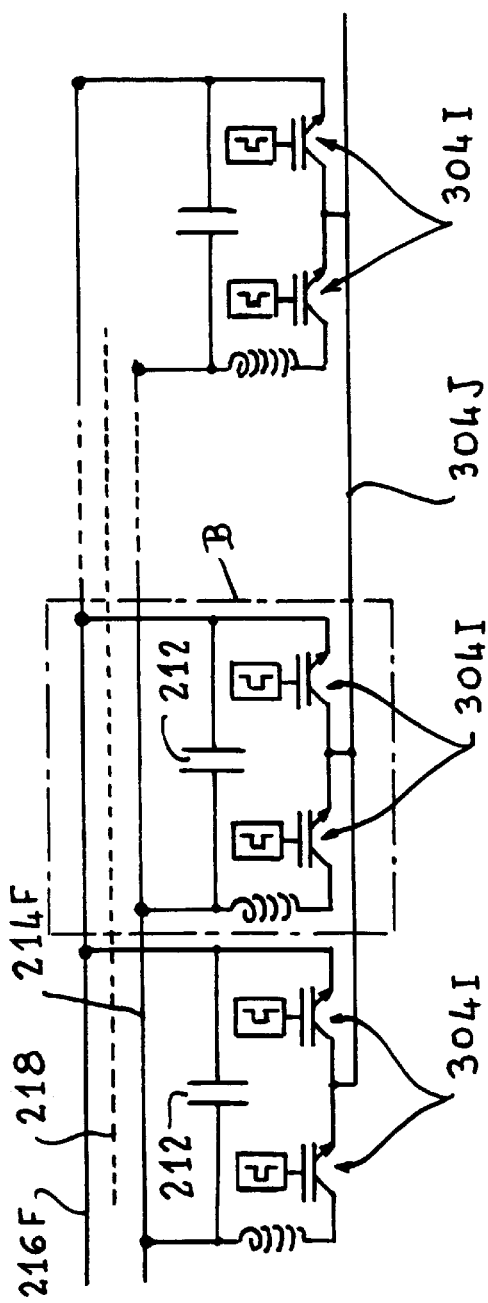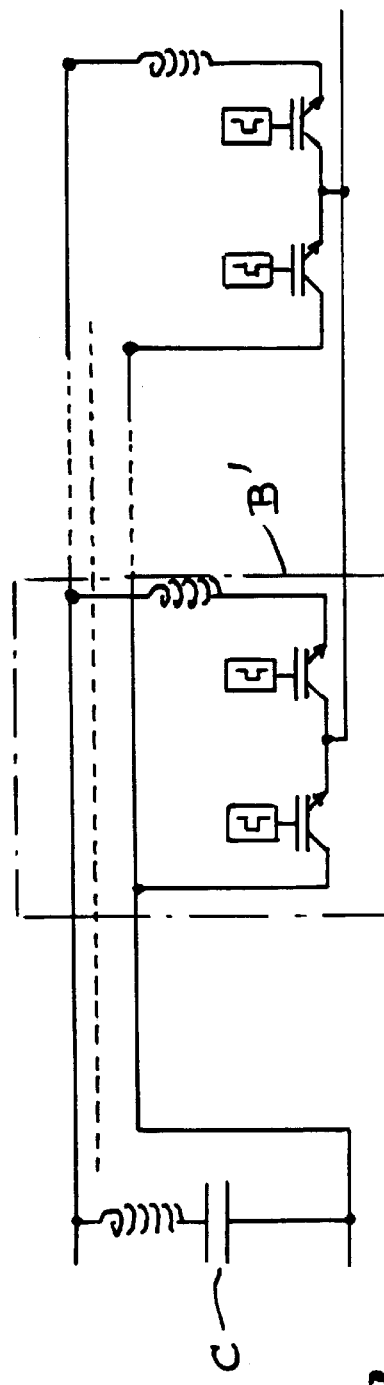
Fig. 7
Fig. 8

ELECTRONIC POWER DEVICE AND ELECTRONIC POWER ASSEMBLY COMPRISING SUCH A DEVICE

BACKGROUND OF THE INVENTION

1. Field of the Invention

The present invention relates to an electronic power device and to an electronic power assembly comprising such a device.

2. Brief Description of the Related Art

Such power devices are known to be made by bolting power modules on metallic cooling elements comprising a volume for the circulation of a heat-exchange fluid. These cooling elements may be subjected to a circulation of air in forced or natural convection, or to a circulation of water. Such power devices also include capacitors performing a double function of uncoupling and of filtering, which are mounted above the power modules.

However, this known arrangement presents certain drawbacks, insofar as the effect of mounting the capacitors above the power modules is to increase the overall thickness of the power device once made, such increase not being desired.

It may also be provided to place the capacitors, not above the power modules, but on the side thereof. However, such a conformation presents an excessively large surface, which is the origin of parasitic phenomena of inductances detrimental to correct electrical functioning of the power device assembly.

It is also known, by U.S. Pat. No. 5,142,439, to make a capacitor battery from a plurality of capacitors disposed in parallel between two connection plates, extending over opposite faces of these capacitors. One of these plates is covered with an insulating surface as well as with an additional conducting plate, so as to form a bus-bar, which is connected to the other connection plate via a connection conductor. This capacitor battery is connected to a power device, the conducting plates of the bus-bar being respectively connected to an emitter and to a collector of this power device.

However, this arrangement has certain drawbacks, insofar as the use of this bus-bar involves numerous connections, at the origin of high parasitic inductances and, in addition, does not enable a compact power device to be produced, due to the presence of the connections extending above the power modules.

In order to overcome the different drawbacks of the prior art set forth hereinabove, the invention proposes to provide an electronic power device of small overall dimensions, which is simple to manufacture and which limits the phenomena of parasitic inductances.

SUMMARY OF THE INVENTION

To that end, the invention relates to an electronic power device comprising at least one sub-system supporting power modules, a capacitor battery placed in communication with an electrical supply being connected to said power modules, said battery comprising one or more capacitors disposed in parallel between two connection plates, characterized in that the or each sub-system has a first face supporting at least one first power module and a second face, opposite the first face and supporting at least one second power module, and in that a first plate is connected to the or each first power module, while a second plate is connected to the or each second power module.

The invention also relates to an electronic power assembly comprising a plurality of electronic power devices and means for connecting these devices to one another, characterized in that these devices are as set forth hereinabove.

BRIEF DESCRIPTION OF THE DRAWINGS

The invention will be more readily understood on reading the following description given solely by way of non-limiting example, with reference to the accompanying drawings, in which:

FIGS. 7 and 8 are electrical diagrams illustrating the operation of power devices according to the invention and according to the prior art, respectively.

DETAILED DESCRIPTION OF THE INVENTION

Figure 1:
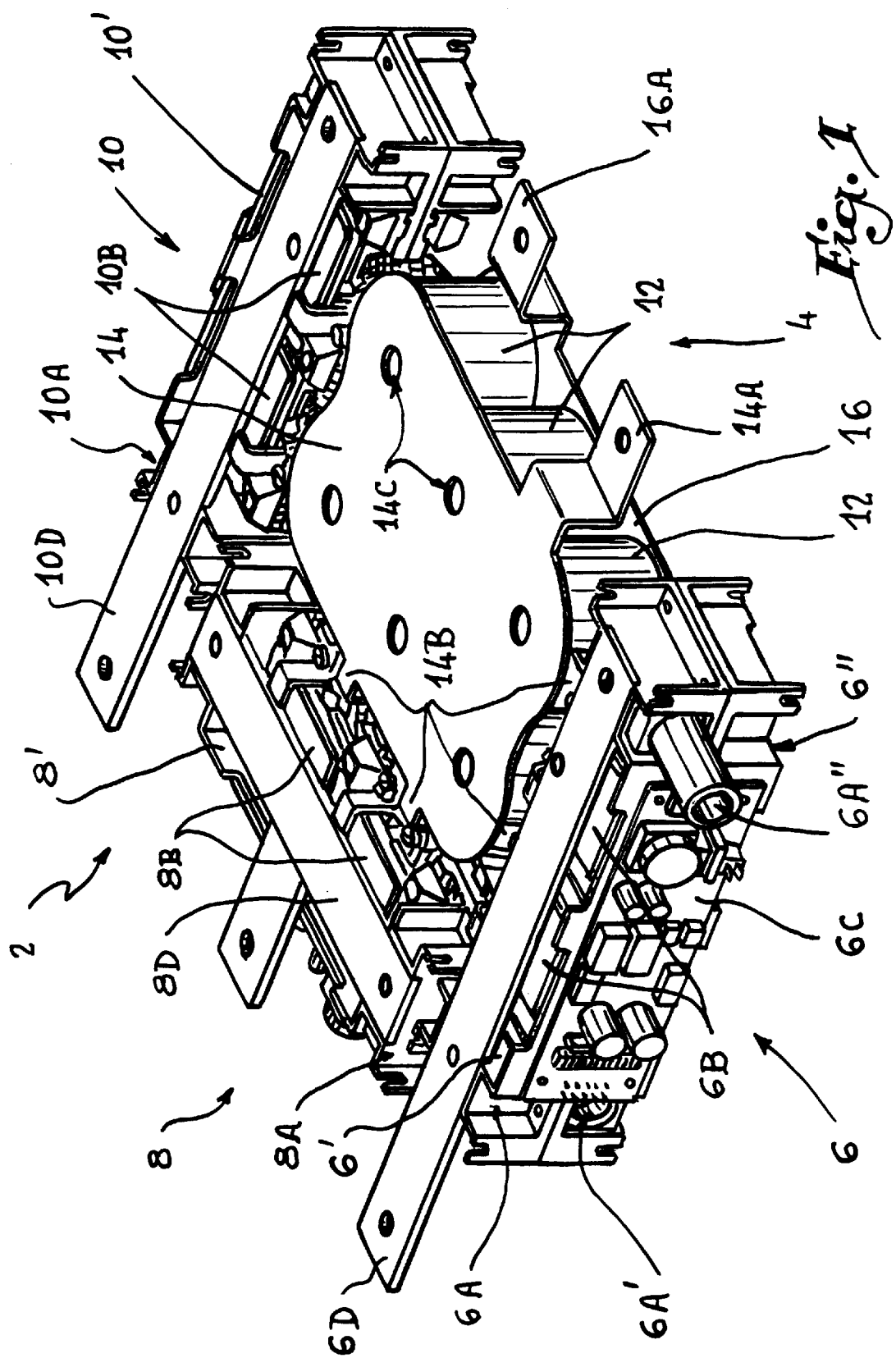
FIGS. 1 and 2 are views in perspective of electronic power devices according to two embodiments of the invention.

Referring now to the drawings, and firstly to FIG. 1, the electronic power device shown therein is an inverter generally designated by reference 2. This inverter comprises a battery 4 of capacitors on the periphery of which are disposed three sub-systems of the inverter, namely phases 6, 8 and 10. It will be assumed in the following, for greater clarity, that the inverter is placed flat.

The battery 4 comprises a plurality of cylindrical wound capacitors 12 disposed side by side, resting on their lower plane ends. These capacitors 12, which are in accordance for example with those marketed under reference 97 RCF 02 by the firm TPC, present a through opening (not shown). They are interposed between two plates 14 and 16 extending at the level of their respectively upper and lower plane ends.

The upper plate 14 is welded at of each upper end of the capacitors 12, which makes it possible electrically to connect the latter to one another. This upper plate 14 is provided with a tab 14A intended to be connected with a terminal (not shown) of an electrical supply. The upper plate 14 is, in addition, provided with a plurality of tongues 14B fixed at power modules of phases 6, 8, 10, as will be described hereinbelow. Similarly, the lower plate 16 is welded at the lower end of the assembly of capacitors 12, and comprises a tab 16A intended to be electrically connected to another terminal of a supply. This plate 16 is also provided with tongues (not shown) similar to those 14B equipping the upper plate 14.

Each phase 6, 8, 10 comprises a respective cooling element 6A, 8A, 10A, which is as described in French Patent Application filed on Feb. 23, 1998 under No. 98 02142 entitled "Cooling element for electronic power device and electronic power device comprising such an element".

These cooling elements comprise a volume for the circulation of water, placed respectively in communication with inlets and outlets of water, of which only those, 6A' and 6A", of element 6A have been shown. Each phase comprises, in addition, on two opposite faces, upper 6', 8', 10' and lower 6", 8" and 10" respectively, of the power modules, of which only those, 6B, 8B and 10B, disposed on the upper faces have been shown.

The plate 14 is provided with orifices 14C made in line with the through openings with which the capacitors are provided. Plate 16 is also provided with such orifices, which have not been shown. These different orifices ensure, by cooperation with the openings of the capacitors 12, the passage of fixing elements, such as for example bolts and spacers made of an insulating material.

Each phase 6, 8, 10 is, in addition, provided with igniters for controlling the power modules 6B, 8B, 10B, igniters of which only that, 6C, of the phase 6 has been shown. In addition, a phase bar 6D, 8D and 10D extends over the upper face 6', 8', 10' of each phase 6, 8, 10. These three phase bars are substantially coplanar.

These phases 6, 8, 10 extend over three of the sides of the battery 4 of capacitors, which takes substantially the shape of a rectangle, seen from above. Each of the tongues 14B equipping the upper plate 14 is electrically connected with a corresponding power module, disposed on the upper face 6', 8', 10' of the phases of the inverter of the invention. Similarly, the tongues (not shown) of the lower plate 16 are connected to the power modules disposed on the lower face 6", 8", 10" of the phases of the inverter. These tongues therefore make it possible electrically to connect the terminals (not shown) of the supply with the assembly of power modules equipping the inverter according to the invention.

The upper plate 14 is substantially coplanar with the phase bars 6D, 8D, 10D disposed on the upper faces 6', 8' and 10' of the phases of the inverter. Similarly, the lower plate 16 is substantially coplanar with the lower faces 6", 8" and 10" of these phases 6, 8, 10. The inverter 2 thus produced takes substantially the shape of a parallelepiped, which therefore renders it remarkably compact.

Figure 2:
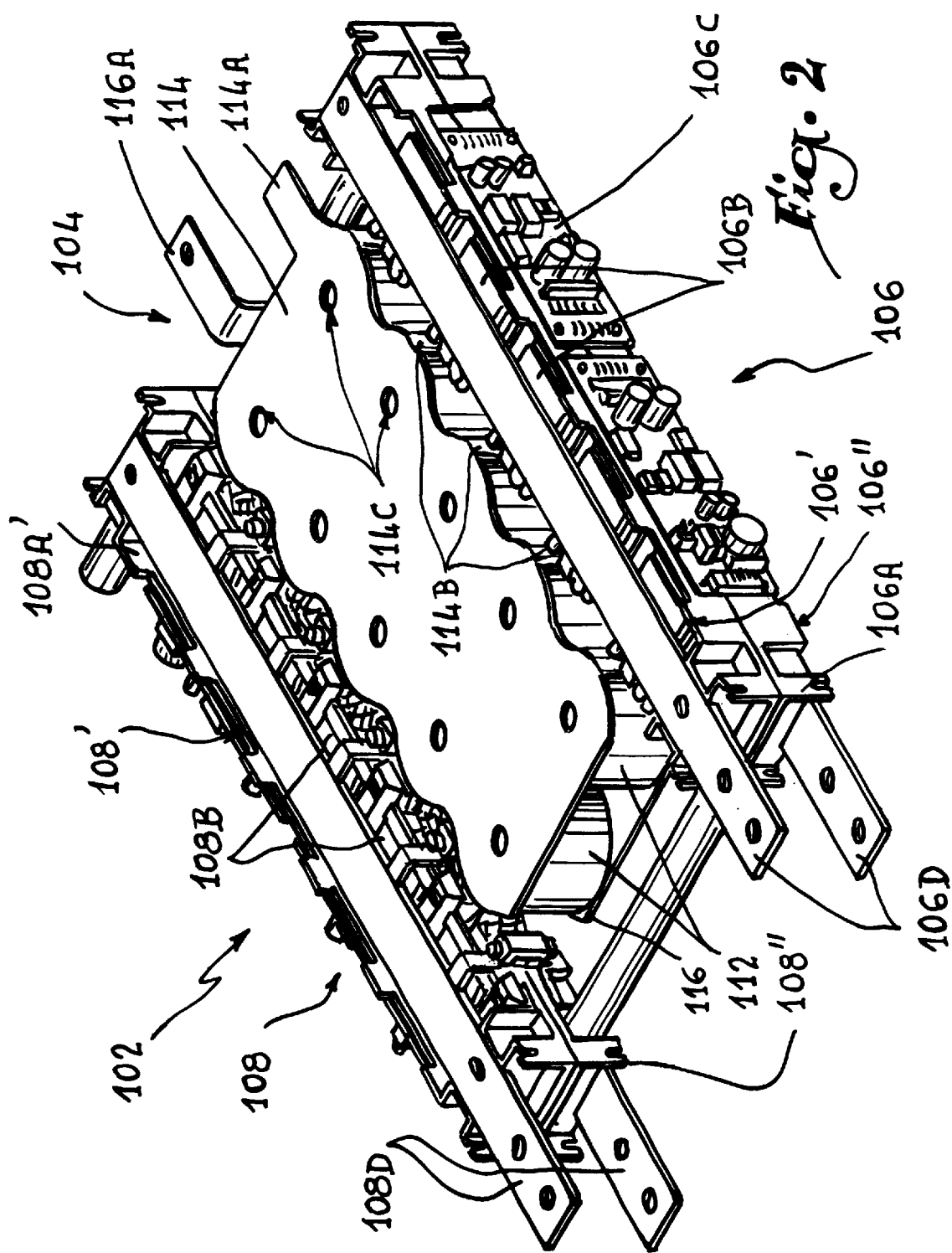

FIG. 2 shows an electronic power device in accordance with a second embodiment of the invention, which is an inverter generally designated by reference 102. This inverter comprises a central battery 104 of capacitors comprising, similarly to that, 4, described hereinabove, two respectively upper (114) and lower (116) plates welded on the capacitor ends 112. These plates are provided with tabs 114A and 116A, with tongues of which only those, 114B, of the upper plate 114 have been shown, and with orifices of which only those, 114C, of plate 114 have been shown.

Two sub-systems of the inverter 102, namely arms 106, 108 are disposed in the vicinity of the large sides of the rectangular plates 114. Each arm comprises a cooling element 106A, 108A supporting power modules 106B, 108B both on their upper faces 106', 108' and on their lower faces 106", 108". Igniters, of which only those, 106C, of the inverter arm have been shown, are also provided.

Each arm 106, 108 is further provided with two phase arms 106D, 108D, extending respectively on the upper faces 106', 108' and lower faces 106" and 108" of these switches. Similarly to what has been described for the inverter 2, each tongue of the upper (114) and lower (116) plates is electrically connected to a corresponding power module so as to connect the latter to a supply (not shown).

The upper plate 114 and the upper phase bars of arms 106, 108 are substantially coplanar. The same applies for the lower plate 116 and the phase bars disposed on the lower face of these arms. The inverter thus formed therefore presents a substantially parallelepipedic shape, which renders it very compact.

These inverters 2 and 102, in particular due to their reduced thickness, are able to be integrated in the floors of electric, so-called "low floor" vehicles.

In the examples shown and described hereinbefore, mention has only been made of a pair of plates presenting, seen from above, a substantially rectangular shape and surrounded on two or three of their sides. The invention is also applicable to a pair of plates presenting any number of sides, surrounded on a certain number of its sides by sub-systems presenting one or two phase bars.

Figure 3:
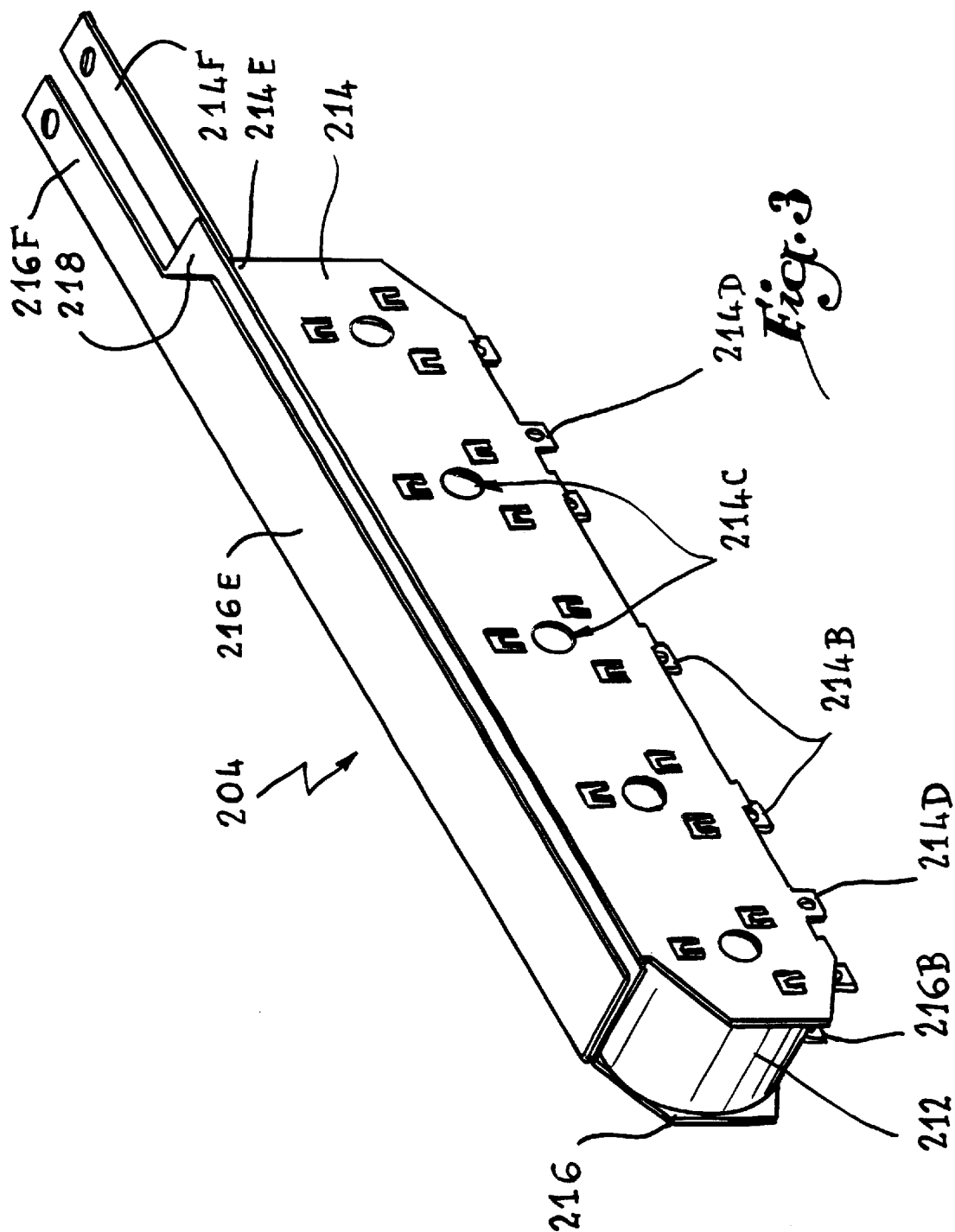
FIG. 3 is a schematic view in perspective illustrating a capacitor battery capable of equipping a power device according to the invention.

FIG. 3 shows a second capacitor battery, generally designated by reference 204. This battery comprises a plurality of wound capacitors 212, on either side of which are welded plates respectively called, by convention, upper 214 and lower 216, similarly to plates 14, 16, 114, 116 which were referred to above.

Each plate 214, 216 comprises a plurality of tongues 214B, 216B for connection to power modules (not shown). Moreover, each plate is pierced with orifices of which only those, 214C, have been shown. These plates 214, 216 are also provided with extensions of which only those, 214D, have been illustrated. These extensions ensure fastening of the capacitor battery 204 on an electrically insulating region of a cooling element (not shown), supporting power modules. Such fixation makes it possible to approach the capacitor battery with respect to this cooling element and therefore to reduce the overall volume of the power device equipped with such a battery, without creating electrical problems due to the insulating nature of the region of the cooling element chosen.

The two plates 214, 216 are in addition provided with respective flaps 214E, 216E bent square from the end of the capacitors 212 opposite the tongues 214B. These flaps 214E, 216E overlap each other mutually over a substantial part of their surface. An insulating foil 218, for example made of "NOMEX" and coated with an epoxy adhesive, is interposed between these flaps 214E, 216E and is fixed thereto for example by adhesion. The assembly formed by the flaps 214E, 216E and the insulating foil 218 forms a bus-bar. This arrangement ensures supply of the power modules by generating an inductance which is sufficiently weak for the capacitor battery 204 to participate in the filtering, without provoking oscillations detrimental to correct functioning of the assembly. The battery 204 performs the role of filtering in complement of the usual outer filtering capacitors, which are not shown in this Figure. Each flap 214E, 216E is, in addition, equipped with a tab 214F, 216F for electrical connection to a terminal (not shown) of a supply.

Figure 4:
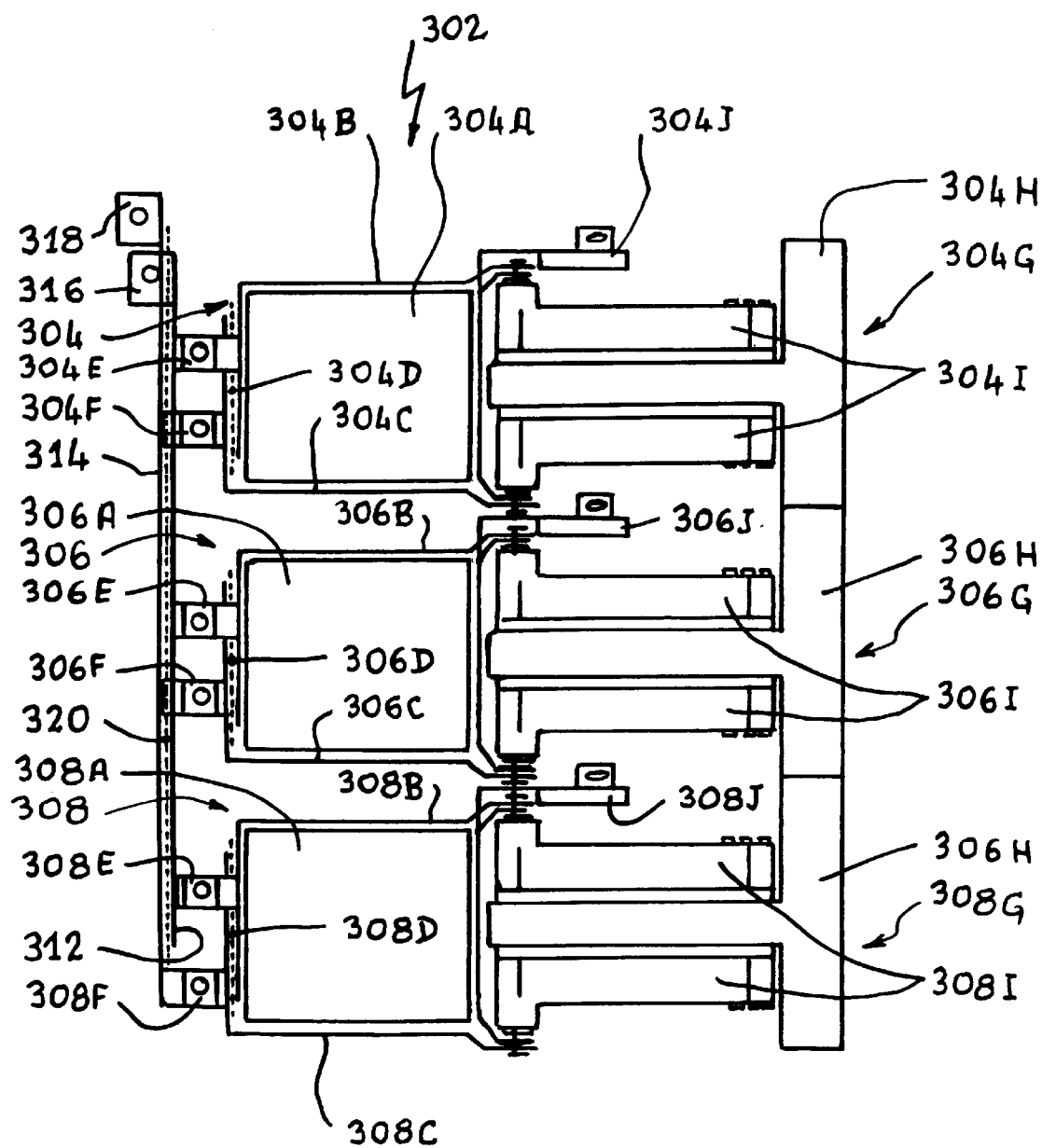
FIGS. 4 to 6 are diagrams illustrating the arrangement of three electronic power assemblies according to the invention.

FIG. 4 schematically shows a first electronic power assembly in accordance with the invention, which is an inverter generally designated by reference 302. This assembly 302 comprises three electronic power devices 304, 306, 308, each of which includes a respective battery of capacitors 304A, 306A, 308A. Each of these batteries is similar to the one, 204, described with reference to FIG. 3 and comprises plates 304B, 304C, 306B, 306C, 308B, 308C of which the flaps form a bus-bar by interposition of an insulating foil 304D, 306D, 308D. Each plate is provided with a respective tab 304E, 304F, 306E, 306F, 308E, 308F.

Tabs 304E, 306E and 308E are connected together by a first conducting rod 312 connected to a first electrical supply terminal 316, while tabs 304F, 306F and 308F are connected to a second conducting rod 314 itself connected to a second supply terminal 318. An insulating foil 320 is interposed between the conducting rods 312 and 314, with the result that the assembly formed by these rods and this insulating foil forms a bus-bar.

Each electronic power device 304, 306, 308 is equipped with a single electronic sub-system, namely an inverter phase 304G, 306G, 308G. Each of these phases comprises, in known manner, a cooling element 304H, 306H, 308H supporting power modules 304I, 306I, 308I which are connected to a phase bar 304J, 306J, 308J. The cooling elements 304H, 306H, 308H are connected together fluidically so as to be able to be supplied by means of one sole cooling fluid inlet.

It should be noted that the cooling elements present a transverse section substantially in the form of a T, with the result that they may be stacked one above the other. This arrangement enables the electronic power devices 304, 306, 308 to be able to be stacked above one another so as to form the inverter 302 according to the invention. In FIG. 4, the inverter only has three phases, but it may be provided to be equipped with four, by including a rheostatic chopper, by stacking four electronic power devices similar to those 304, 306, 308 of this FIG. 4. It may also be provided to connect the phase bars 304J, 306J and 308J together electrically, so as to form a single overall phase from the original phases 304G, 306G and 308G, the power of which overall phase is equal to the sum of the powers of the original phases. Such an overall phase may then be connected to other phases, so as to form a high-power inverter.

Figure 5:
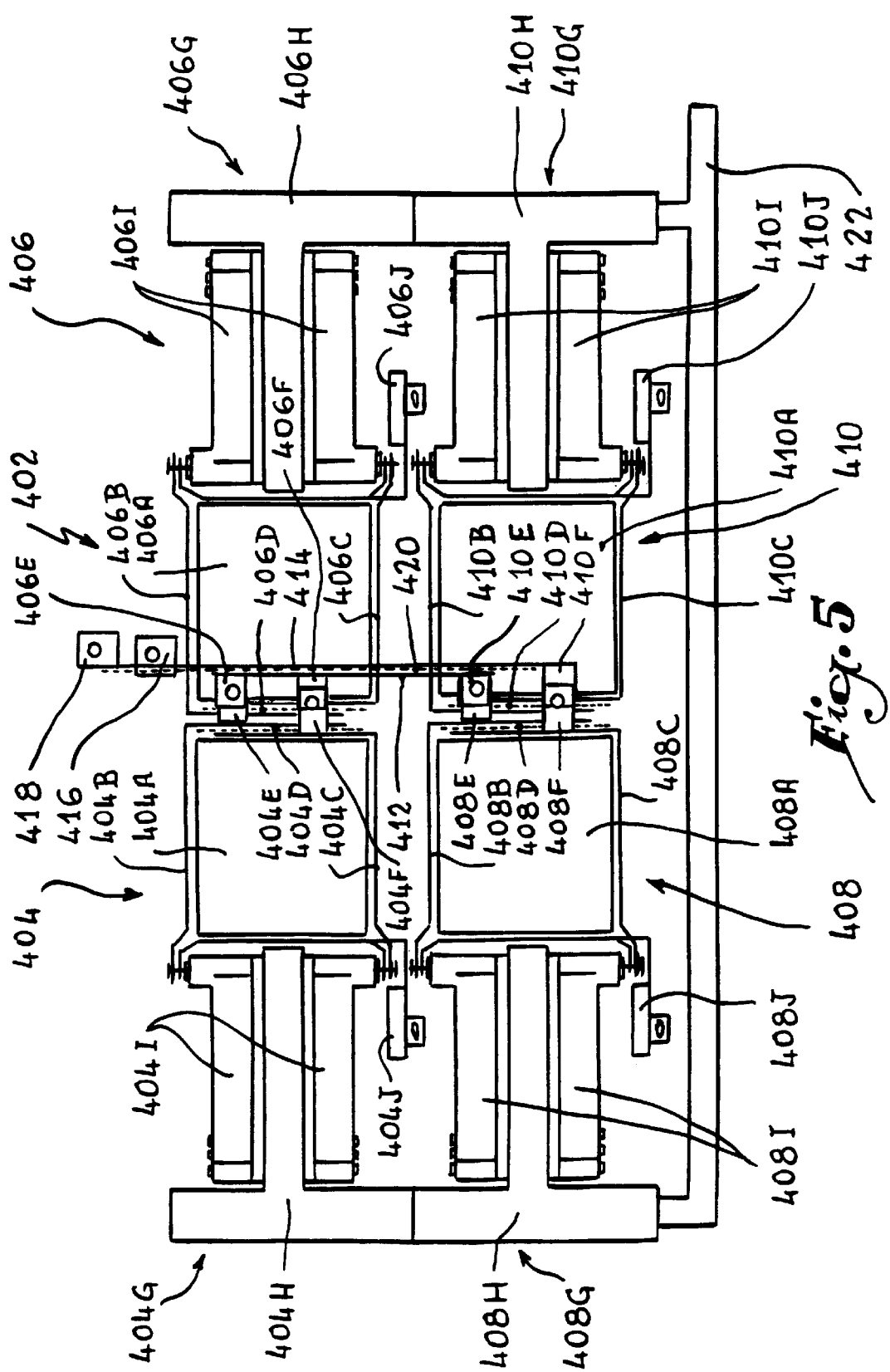

FIG. 5 shows a second embodiment of an electronic power assembly in accordance with the invention, which is an inverter generally designated by reference 402. This inverter comprises four electronic power devices 404, 406, 408, 410 each including a capacitor battery 404A to 410A in accordance with the invention.

Each of these batteries comprises two plates 404B, 404C to 410B, 410C, which are provided with respective flaps between which is interposed an insulating foil 404D to 410D, so as to form a bus-bar.

Each plate is provided with tabs 404E, 404D to 410E, 410F. Tabs 404E, 406E, 408E, 410E are connected to one another by means of a conducting member, such as a rod 412, itself connected to a first electrical supply terminal 416, while tabs 404F, 406F, 408F, 410F are connected to one another by means of a second rod 414, itself connected to a second electrical supply terminal 418. Between these terminals 416 and 418 there is interposed an insulating foil 420, so as to form a bus-bar.

Being given that the capacitor batteries 404A to 410A are adjacent, it is possible to join their tabs 404E, 404F to 410E, 410F by means of a single pair of conducting rods 412, 414.

Each capacitor battery 404A to 410A is provided with a single power sub-system, namely a corresponding inverter phase 404G to 410G. Each of these phases is equipped with a cooling element 404H to 410H supporting power modules 404I to 410I, which are connected to a phase bar 404J to 410J.

The cooling elements 404H to 410H present the form of a T in cross-section, with the result that the first pair of devices 404, 406 may be stacked above the second pair of power devices 408, 410, at the level of the cooling elements of each of the latter. Moreover, a connection 422 intended for transporting a cooling fluid places the lower cooling elements 408H and 410H in communication, with the result that these latter may be supplied by means of a single fluid inlet. Moreover, each of these cooling elements is placed in fluidic communication with the cooling element which is disposed thereabove. The inverter 402 in accordance with the invention therefore presents four phases, including a rheostatic chopper, and is formed by stacking two pairs of power devices on one another.

It may also be provided to electrically connect the phase bars 404J and 408J, on the one hand, and phase bars 406J and 410J, on the other hand.

A first overall phase is then obtained, formed from the original phases 404G and 408G, as well as a second overall phase from original phases 406G and 410G.

The overall phases present double power and may be connected to one or two additional phases, in order to constitute a high-power inverter.

Figure 6:
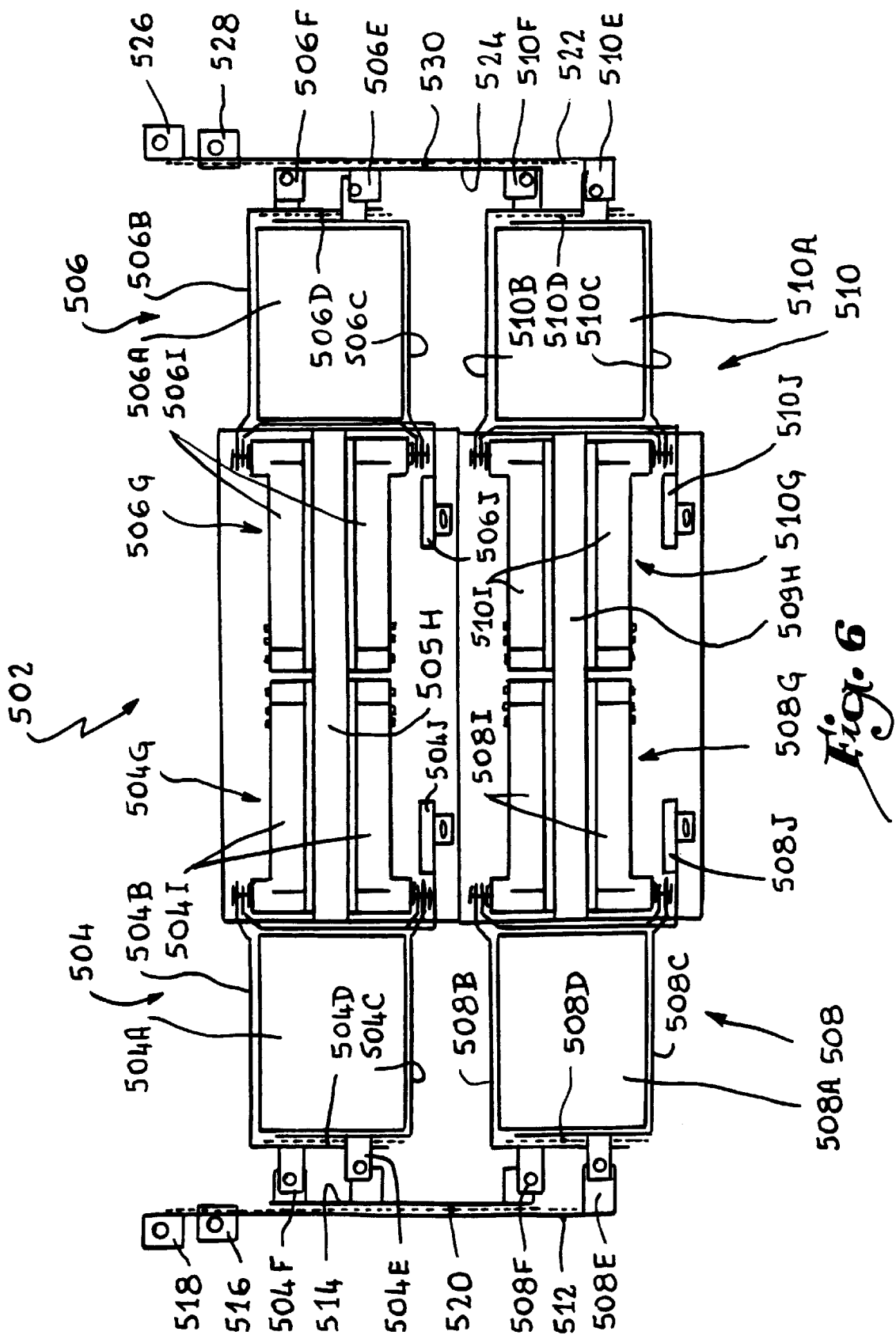

FIG. 6 shows a third embodiment of a power assembly in accordance with the invention, which is an inverter generally designated by reference 502. This converter comprises four electronic power devices 504, 506, 508, 510. These latter each include a single electronic subsystem, namely a corresponding inverter phase 504G to 510G. A first pair of phases 504G, 506G is disposed substantially along a common plane and is stacked above a second pair of phases 508G, 510G which is itself disposed in another common plane.

Each pair of phases located in a same plane presents a common cooling element, namely element 505H for phases 504G and 506G, and element 509H for phases 508G and 510G. Each phase 504G to 510G comprises power modules 504I to 510I supported by the corresponding cooling element and connected to a phase bar 504J to 510J.

Each of the phases 504G to 510G is connected to a capacitor battery in accordance with the invention, respectively 504A to 510A. Each of these batteries is provided with a pair of plates 504B, 504C to 510B, 510C provided with flaps between which is disposed an insulating foil 504D to 510D so as to form a bus-bar. Each of the flaps formed by the plates presents tabs 504E, 504F to 510E, 510F similar to those, 412F, 416F described with reference to FIG. 3.

The tabs 504E and 508E are electrically connected to one another via a first conducting rod 512, while the tabs 504F and 508F are mutually joined by a third conducting rod 514. Between each of these conducting rods 512, 514, which are connected to first and second electrical supply terminals 516, 518, there is interposed an insulating foil 520, forming, with these conducting rods, a bus-bar.

Similarly, the tabs 506E and 510E, on the one hand, and tabs 506F and 510F, on the other hand, are mutually connected by means of respective rods 522, 524 connected to corresponding terminals 526, 528 of an electrical supply. An insulating foil 530 is, in addition, interposed between these conducting rods 526, 528 so as to form a bus-bar.

It may be provided to electrically connect, on the one hand, the phase bars 504J and 506J, and, on the other hand, the phase bars 508J and 510J. In this way, two overall phases of double power are obtained, respectively from the original phases 504G and 506G, on the one hand, and from phases 508G and 510G, on the other hand. The two overall phases may be placed in communication with one, and even two additional phases, so as to constitute a high-power inverter.

All the examples described and shown with reference to FIGS. 4 to 6 refer to a capacitor battery whose plates present flaps between which are interposed insulating foils intended to form a bus-bar. However, it is also possible to produce inverters similar to those, 301, 402 and 502, shown in FIGS. 4 to 6, from capacitor batteries similar to those, 4 and 104, shown with reference to FIGS. 1 and 2. Moreover, in these FIGS. 4 to 6, the capacitor batteries include a single row of a plurality of capacitors disposed one behind the other. It may also be provided to produce a capacitor battery including a plurality of these rows, disposed side by side.

The invention makes it possible to attain the objectives mentioned hereinbefore. In effect, the capacitor battery of the invention ensures for the power device which is equipped therewith, a noteworthy reduction of the parasitic inductances. In this respect, reference should be made to FIG. 7 which is an electrical diagram illustrating the operation of a power device including a capacitor battery in accordance with the invention.

This FIG. 7 shows the different elements constituting the capacitor battery 204 shown in FIG. 3. For example, plates 214F, 216F, connected to electrical supply terminals (not shown) are marked. These plates 214F, 216F are connected to the capacitors 212 which are themselves connected to power modules such as those, 304I, shown with reference to FIG. 4. A phase bar, such as that, 304J, of FIG. 4, is electrically connected to the assembly of these power modules 304I.

As may be observed in this FIG. 7, there exist, within an electronic power device equipped with a capacitor battery according to the invention, a multiplicity of commutation loops B, each of which presents a certain inductance generating excess voltages. Now, according to the invention, these commutation loops are disposed in parallel, with the result that the excess voltages thus generated increase only very little with the current. This must be compared with an electrical diagram of the prior art, shown in FIG. 8, in which there is a single capacitor C intended to supply the assembly of the commutation loops B'. Due to this arrangement, the excess voltages inherent in such a power device tend to increase virtually linearly with the current.

The shape of the power device of the invention guarantees a set of connectors considerably reduced with respect to what was used in the prior art, it being given that the supply to the different power modules is electrically connected directly via two conducting plates with which the capacitor battery is provided.

The fact of arranging the two connection plates in coplanar manner with the respective faces of the or each electrical sub-system renders the power device according to the invention remarkably compact.

What is claimed is:

1. An electronic power device which includes at least one sub-system supporting power modules, a capacitor battery, said capacitor battery comprising at least one capacitor disposed perpendicularly to and connected between first and second connection plates, said at least one sub-system having a first face supporting at least one first power module and a second face, opposite said first face, supporting at least one second power module, said first plate being connected to said at least one first power module and said second plate being connected to said at least one second power module, and each of said first and second plates having means for connecting said capacitor battery to an electrical power supply whereby said at least one first and second power modules are connected to a power supply through said first and second plates.

2. The device of claim 1 wherein said first plate is substantially co-planar with said first face of said at least one sub-system, and said second plate is substantially co-planar with said second face of said at least one sub-system.

3. The device of claim 1 including a plurality of sub-systems, said first faces of each of said plurality of sub-systems being substantially co-planar and second faces of each of said plurality of sub-systems, opposite said first faces, being substantially co-planar, and an overall volume of said capacitor battery being defined between said first and second faces.

4. The device of claim 3 wherein said capacitor battery is disposed at a central portion of said device and said sub-systems are disposed along a peripheral portion of said capacitor battery.

5. The device of claim 1 wherein said first and second plates of said capacitor battery are mounted on an electrically insulating region of a cooling element.

6. The device of claim 1 which defines an inverter, said capacitor battery including a plurality of capacitors extending parallel with respect to one another between said first and second plates, said first plate of said capacitor battery electrically connecting first ends of said plurality of capacitors together and said second plate of said capacitor battery electrically connecting said second ends of said plurality of capacitors, said inverter having a plurality of sub-systems each having cooling elements which define said first and second faces for each of said sub-systems and said first and second plates include first and second power supply terminals, respectively, for connecting a plurality of first and second power modules which are disposed on said first and second faces of said cooling elements with the electrical power supply.

7. The device of claim 6 wherein said first and second plates are substantially rectangular, said plurality of sub-systems including three phases each having a phase bar, and said phase bars extending along three sides of said first and second plates.

8. The device of claim 6 wherein said first and second plates are substantially rectangular, and said plurality of sub-systems including two arms each arm carrying two phase bars.

9. The device of claim 1 wherein said first and second plates are provided with tongues, each tongue being connected to a corresponding power module.

10. The device of claim 1 wherein said means for connecting to an electrical supply includes each of said first and second plates having a tab adapted to electrically connect to a corresponding terminal of the electrical supply.

11. The device of claim 1 wherein said capacitor battery includes a plurality of capacitors each having a central through opening and each of said first and second plates being provided with orifices in alignment with said openings.

12. The device of claim 1 wherein each of said first and second plates includes flaps projecting towards one another and which at least partially overlap, and an insulating foil being disposed between said flaps.

13. An electronic power assembly comprising a plurality of electronic power devices, each of said electronic power devices including at least one sub-system supporting power modules, and a capacitor battery, said capacitor battery including at least one capacitor disposed perpendicularly to and connected between first and second connection plates, wherein said at least one sub-system has a first face supporting at least one first power module and a second face, opposite said first face, supporting at least one second power module, said first plate being connected to said at least one first power module and said second plate being connected to said at least one second power module, and each of said first and second plates having means for connecting said capacitor battery to an electrical power supply whereby said at least one first and second power modules are connected to a power supply through said first and second plates.

14. The electronic assembly of claim 13 which defines an inverter having a plurality of phases, each of said phases comprising a plurality of said power devices placed in parallel whereby power supply to each phase is proportional to a number of said power devices.

15. The electronic assembly of claim 13 which defines an inverter, and each power device including a single sub-system which constitutes a phase of said inverter.

16. The electronic assembly of claim 15 wherein said power devices are stacked relative to one another.

17. The electronic assembly of claim 15 wherein first and second pairs of power devices are disposed in respective first and second planes, and said first and second pairs being stacked relative to one another.

18. The electronic assembly of claim 17 wherein said capacitor battery of each of said power devices of each pair of power devices are adjacent one another.

19. The electronic assembly of claim 17 wherein said phases of each power device of each pair of devices are adjacent one another.

20. The electronic assembly of claim 19 wherein said phases which are adjacent one another define a common cooling element.

* * * * *